(12) United States Patent
Yao

(10) Patent No.: US 9,329,396 B2
(45) Date of Patent: May 3, 2016

(54) IMAGE DISPLAYING SHEET

(75) Inventor: Ming Tang Yao, New Taipei (TW)

(73) Assignee: E-LON OPTRONICS CO., LTD., New Taipei (TW)

(*) Notice: Subject to any disclaimer, the term of this patent is extended or adjusted under 35 U.S.C. 154(b) by 615 days.

(21) Appl. No.: 13/592,469

(22) Filed: Aug. 23, 2012

(65) Prior Publication Data

US 2014/0016194 A1 Jan. 16, 2014

(30) Foreign Application Priority Data

Jul. 13, 2012 (TW) .............................. 101125392 A

(51) Int. Cl.
*G02B 27/22* (2006.01)
*H04N 13/02* (2006.01)

(52) U.S. Cl.
CPC ........ *G02B 27/2214* (2013.01); *H04N 13/0228* (2013.01)

(58) Field of Classification Search
CPC . G02B 3/005; G02B 27/2214; H04N 13/0228
USPC .............................. 359/462, 463, 621; 348/59
See application file for complete search history.

(56) References Cited

U.S. PATENT DOCUMENTS

| 5,528,420 A | * | 6/1996 | Momochi ..................... 359/463 |
| 7,660,038 B2 | * | 2/2010 | Uehara et al. ................. 359/463 |
| 2009/0262419 A1 | * | 10/2009 | Robinson et al. ............. 359/463 |

* cited by examiner

*Primary Examiner* — Audrey Y Chang
(74) *Attorney, Agent, or Firm* — WPAT, PC; Justin King

(57) ABSTRACT

An image displaying sheet includes a lens array composed of plural lenticular lenses, wherein the lenticular lens has curvatures along two different directions. A composite image has image periods along the two different directions. The application of the image displaying sheet on the composite image can generate the morphing effect, the dynamic effect, the 3D effect, the depth effect or the zooming effect of the composite image.

5 Claims, 5 Drawing Sheets

IMAGE DISPLAYING SHEET

FIELD OF THE INVENTION

The present invention relates to an image displaying sheet with a lens sheet, and more particularly to an image displaying sheet with a lenticular lenses sheet.

BACKGROUND OF THE INVENTION

Nowadays, 3D imaging technologies experience great growth and are now rapidly gaining in popularity. Generally, the current 3D imaging technologies are divided into a 3D stereoscopic technology and a 3D autostereogram technology. For example, polarizing glasses and shutter glasses are commercialized products that comply with the 3D stereoscopic technology. Moreover, the commercialized products complying with the 3D autostereogram technology include for example a parallax barrier and a lenticular lens.

FIG. 1 schematically illustrates an imaging method for a conventional lenticular lens sheet. As shown in FIG. 1, the lenticular lens sheet 10 is composed of plural parallel elongated convex lenses 101. A synthetic image 12 is placed near a flat plane 102 of the lenticular lens sheet 10. For example, the synthetic image 12 is synthesized by portions of sub-image strips of two sub-images 121 and 122. That is, the odd-numbered portions of the sub-image 121 and the even-numbered portions of the sub-image 122 are interlaced with each other to constitute the synthetic image 12. Moreover, human eyes 14 are separated from a lens surface 104 of the lenticular lens sheet 10 by a certain distance. In a case that the synthetic image 12 is viewed through the lenticular lens sheet 10 by the human eyes 14, the 3D effect or the animation-like effect of the synthetic image 12 is viewable.

Generally, the parameters of the elongated convex lens 101 includes the angle, the pitch or period, the curvature radius of a lenticule, the thickness, the thickness of the substrate below the curved surface of a lens, and the refractive index of the lens. The viewing angle of the image that can be seen by the observer is related to the angle and the refractive index of the lens. In a case that the refractive index is fixed, the synthetic image 12 corresponding to the narrow-angle lenticular lens sheet 10 tends to have the 3D effect, but the synthetic image 12 corresponding to the wide-angle lenticular lens sheet 10 tends to have the dynamic effect.

Moreover, since the general lenticular lens sheet 10 only has the repeated curvature radius along the one-dimensional direction, the human eyes 14 are only able to watch the one-dimensional dynamic effect. Similar to the lenticular lens sheet 10, a lens array 25 composed of plural spherical lenses in an array is shown in FIG. 2. Since each of the spherical lenses has a 360-degree curvature, the 3D effect or the dynamic effect along multi-dimensional directions may be achieved.

However, since a precise mold is required to produce the spherical lens array, the fabricating cost is very high. In other words, the applications of the spherical lens array are restricted.

SUMMARY OF THE INVENTION

The present invention provides an image displaying sheet with a lens array composed of plural lenticular lenses, wherein the lenticular lens has curvatures along two different directions. Through the image displaying sheet, various imaging effects can be shown.

The present invention provides an image displaying sheet with plural lenticular lenses, wherein the lenticular lens has curvatures along two different directions. The present invention also provides a composite image, which is produced by an interlacing technology. The uses of the image displaying sheet and the composite image can generate the two-dimensional morphing effect, the 3D effect, the dynamic effect, the depth effect or the zooming effect of the composite image.

The present invention further provides an image displaying sheet with plural lenticular lenses, wherein the lenticular lens has curvatures along two different directions. The image displaying sheet can be produced by the current fabricating method, and the fabricating cost is relatively lower than the conventional method of fabricating spherical lenses.

In accordance with an aspect of the present invention, there is provided an image displaying sheet. The image displaying sheet includes a composite image and a lens array. The composite image includes plural composite image units. The plural composite image units are arranged in a two-dimensional array. The plural composite image units have a first image period along a first direction and a second image period along a second direction, wherein the first direction and the second direction are different. The lens array is stacked on the composite image. The lens array has a first surface and a second surface opposed to the first surface. Moreover, plural lenticular lenses are distributed on the first surface. The composite image is stacked on the second surface. The plural lenticular lenses on the first surface have a first lens period along the first direction and a second lens period along the second direction.

In an embodiment, the first image period is equal to the first lens period or the second lens period, and the second image period is equal to the first lens period or the second lens period.

In an embodiment, the first direction and the second direction are orthogonal to each other.

In an embodiment, each of the lenticular lenses has four identical curvatures on the first surface, and a size of a projection zone on the second surface corresponding to each of the curvatures is equal to the first lens period or the second lens period. Optionally, a distance from a climax of each curvature on the first surface to the second surface is three times the curvature.

In an embodiment, the composite image includes a portion of a first interlaced image and a portion of a second interlaced image. The composite image is produced by the following steps. Firstly, the first interlaced image and the second interlaced image are sliced into plural rows of first interlaced sub-image strips of the first interlaced image and plural rows of second interlaced sub-image strips of the second interlaced image along a direction parallel with the first direction. Then, plural odd-numbered rows of first interlaced sub-image strips and plural even-numbered rows of second interlaced sub-image strips are selected. Then, the selected odd-numbered rows of first interlaced sub-image strips and the selected even-numbered rows of second interlaced sub-image strips are interlaced into the composite image. Moreover, each of the first interlaced sub-image strips is adjacent to two of the second interlaced sub-image strips, and the second image period is an integral multiple of a total width of the first interlaced sub-image strip and the second interlaced sub-image strip.

In an embodiment, the first interlaced image or the second interlaced image is composed of portions of N original images, wherein N is a positive integer larger than 1. The first interlaced image or the second interlaced image is produced by the following steps. Firstly, the N original images are sorted, so that each of the N original images is assigned as an M-th original image, wherein M sequentially denotes plural positive integers from 1 to N. Then, each M-th original image is sliced into plural columns of M-th sub-image strips along a direction parallel with the second direction. Then, (M+N×C)-th columns of M-th sub-image strips of each M-th original image are selected, wherein C sequentially denotes 0 and plural positive integers equal to or larger than 1. Afterwards, the selected (M+N×C)-th columns of M-th sub-image strips of the M-th original image are interlaced into the first interlaced image or the second interlaced image, wherein the first image period is equal to a total width of the M-th sub-image strips of the M-th original image.

In an embodiment, a percentage difference between the first lens period and the first image period is smaller than 25%, or a percentage difference between the first lens period and the first image period is smaller than 10%.

In an embodiment, a percentage difference between the second lens period and the second image period is smaller than 25%, or a percentage difference between the second lens period and the second image period is smaller than 10%.

In an embodiment, the composite image is composed of portions of J interlaced images, wherein J is a positive integer larger than 2. The composite image is produced by the following steps. Firstly, the J interlaced images are sorted, so that each of the J interlaced images is assigned as a K-th interlaced image, wherein K sequentially denotes plural positive integers from 1 to J. Then, each K-th interlaced image is sliced into plural rows of K-th interlaced sub-image strips of the K-th interlaced image along a direction parallel with the first direction. Then, (K+J×L)-th rows of K-th interlaced sub-image strips of the K-th interlaced image are selected, wherein L sequentially denotes 0 and plural positive integers equal to or larger than 1. Afterwards, the selected (K+J×L)-th rows of K-th interlaced sub-image strips of the K-th interlaced image are interlaced into the composite image, wherein the second image period is equal to the total width of the K-th interlaced sub-image strips of the K-th interlaced image.

In an embodiment, each of the interlaced images is composed of portions of N original images, wherein N is a positive integer larger than 1. Each of the interlaced images is produced by the following steps. Firstly, the N original images are sorted, so that each of the N original images is assigned as an M-th original image, wherein M sequentially denotes plural positive integers from 1 to N. Then, each M-th original image is sliced into plural columns of M-th sub-image strips along a direction parallel with the second direction. Then, (M+N×C)-th columns of M-th sub-image strips of each M-th original image are selected, wherein C sequentially denotes 0 and plural positive integers equal to or larger than 1. Afterwards, the selected (M+N×C)-th columns of M-th sub-image strips of the M-th original image are interlaced into the interlaced image, wherein the first image period is equal to a total width of the M-th sub-image strips of the M-th original image.

In accordance with another aspect of the present invention, there is provided a lens array. The lens array has a first surface and a second surface opposed to the first surface. Moreover, plural lenticular lenses are distributed on the first surface. The plural lenticular lenses on the first surface have a first lens period along an X direction and a second lens period along a Y direction.

In an embodiment, each of the lenticular lenses has four identical curvatures on the first surface, and a size of a projection zone on the second surface corresponding to each of the curvatures is equal to the first lens period or the second lens period. Optionally, a distance from a climax of each curvature on the first surface to the second surface is three times the curvature.

In an embodiment, the first lens period is equal to the second lens period.

In accordance with a further aspect of the present invention, there is provided a composite image to be watched through the lens array of the present invention. The composite image includes plural composite image units, which are arranged in a two-dimensional array. The plural composite image units have a first image period along the X direction and a second image period along the Y direction.

In an embodiment, the composite image is composed of portions of J interlaced images, wherein J is a positive integer larger than 2. The composite image is produced by the following steps. Firstly, the J interlaced images are sorted, so that each of the J interlaced images is assigned as a K-th interlaced image, wherein K sequentially denotes plural positive integers from 1 to J. Then, each K-th interlaced image is sliced into plural rows of K-th interlaced sub-image strips of the K-th interlaced image along a direction parallel with the X direction. Then, the (K+J×L)-th rows of K-th interlaced sub-image strips of the K-th interlaced image are selected, wherein L sequentially denotes 0 and plural positive integers equal to or larger than 1. Afterwards, the selected (K+J×L)-th rows of K-th interlaced sub-image strips of the K-th interlaced image are interlaced into the composite image, wherein the second image period is equal to the total width of the K-th interlaced sub-image strips of the K-th interlaced image.

In an embodiment, the each of the interlaced images is composed of portions of N original images, wherein N is a positive integer larger than 1. Each of the interlaced images is produced by the following steps. Firstly, the N original images are sorted, so that each of the N original images is assigned as an M-th original image, wherein M sequentially denotes plural positive integers from 1 to N. Then, each M-th original image is sliced into plural columns of M-th sub-image strips along a direction parallel with the Y direction. Then, (M+N×C)-th columns of M-th sub-image strips of each M-th original image are selected, wherein C sequentially denotes 0 and plural positive integers equal to or larger than 1. Afterwards, the selected (M+N×C)-th columns of M-th sub-image strips of the M-th original image are interlaced into the interlaced image, wherein the first image period is equal to a total width of the M-th sub-image strips of the M-th original image.

In an embodiment, the original images are acquired by capturing an object from plural viewpoints.

In an embodiment, a percentage difference between the first lens period and the first image period is smaller than 25%, and a percentage difference between the second lens period and the second image period is smaller than 25%. Alternatively, a percentage difference between the first lens period and the first image period is smaller than 10%, and a percentage difference between the second lens period and the second image period is smaller than 10%.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
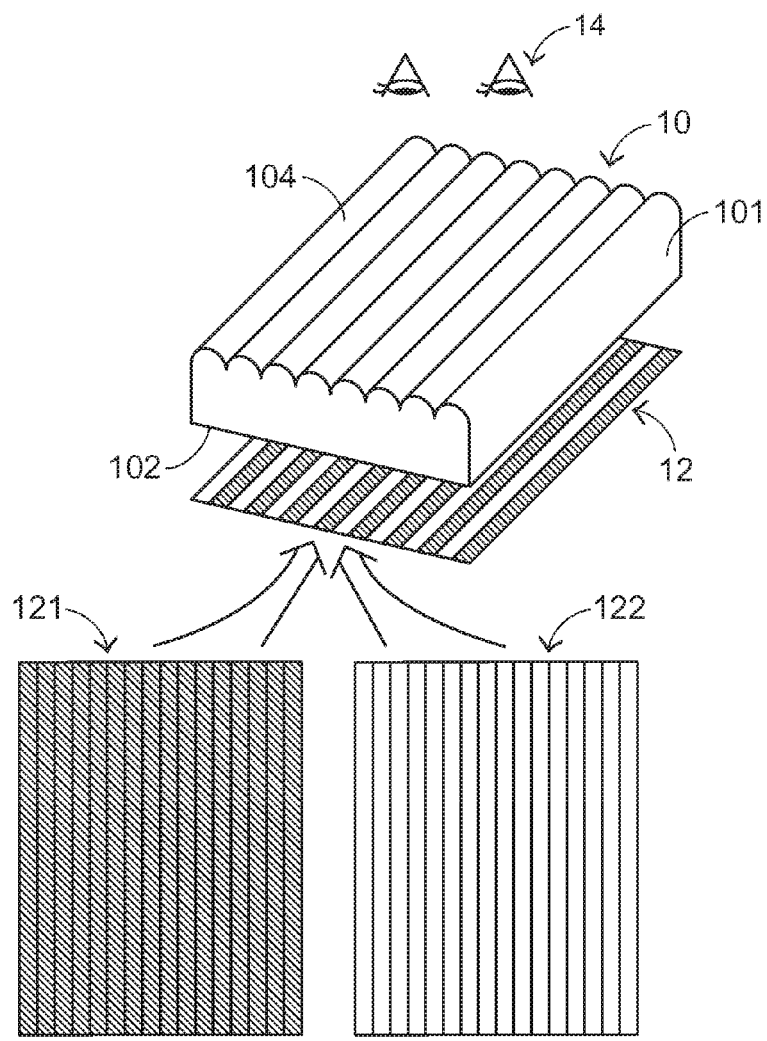
FIG. 1 schematically illustrates an imaging method for a conventional lenticular lens sheet.
Figure 2:
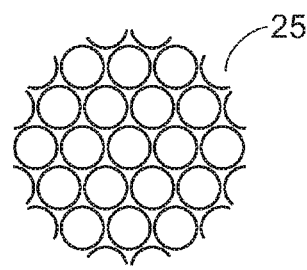
FIG. 2 is a schematic top view illustrating conventional a spherical lens array.

In this context, the term "lenticular lens sheet" denotes a lens sheet made of thermosetting resin, thermoplastic resin, thermosetting plastic, thermoplastic plastic or any other polymeric material. For example, the lenticular lens sheet may be made of biaxial oriented polyester (OPET) or amorphous polyester (APET). Moreover, the lenticular lens sheet may be made of a composite material (e.g. a coated substrate). For example, the lenticular lens sheet may be produced by coating a heat sealable polymer layer or a heat sealable resin on an ethylene-methyl acrylate copolymer (EMA) layer, an ethylene vinyl acetate copolymer (EVA) layer, an ethylene-butyl acrylate copolymer (EBA) layer, a polypropylene (PP) layer o a polyethylene (PE) layer.

Moreover, the image interlacing process used in the present invention is based on the current interlacing technology. In a case that plural original images are complete images generated by an image pickup device or designed by a computer, the original images are firstly sorted, and then the sorted original images are sliced into plural sub-image strips along a single direction. For example, the plural original images comprise two original images. After the two original images are sliced into sub-image strips, the odd-numbered columns of sub-image strips of the first original image are retained and the even-numbered columns of sub-image strips of the second original image are retained. Then, the odd-numbered columns of sub-image strips of the first original image and the even-numbered columns of sub-image strips of the second original image are interlaced with each other in order to produce interlaced images. Then, the interlaced images are interlaced into the composite image of the present invention.

In a case that the plural original images comprise three original images, after the three original images are sliced into sub-image strips, the first, fourth and seventh columns of sub-image strips of the first original image are retained, the second, fifth and eighth columns of sub-image strips of the second original image are retained, and the third, sixth and ninth columns of sub-image strips of the third original image are retained. Then, the retained sub-image strips of the first original image, the retained sub-image strips of the second original image and the retained sub-image strips of the third original image are interlaced with each other in order to produce an interlaced image.

In this context, the sub-image strip has strip-like appearance. That is, the sub-image strip may be considered as a rectangular image with a long side and a short side. In views of pixels, the number of pixels of the side which is parallel with the slicing direction (i.e. the long side) is greater than the number of pixels of the side which is not parallel with the slicing direction (i.e. the short side). For clarification and brevity, the sub-image strip whose short side has one pixel and long side has plural pixels will be illustrated in the following embodiments. It is noted that the short side of the sub-image strip may have more than one pixel.

As known, the commercially available lenticular lens sheet has a lens period (or a lens array density) along a single direction. Generally, the lens width or the lens array density is denoted as lenses per inch (LPI).

Figure 3:
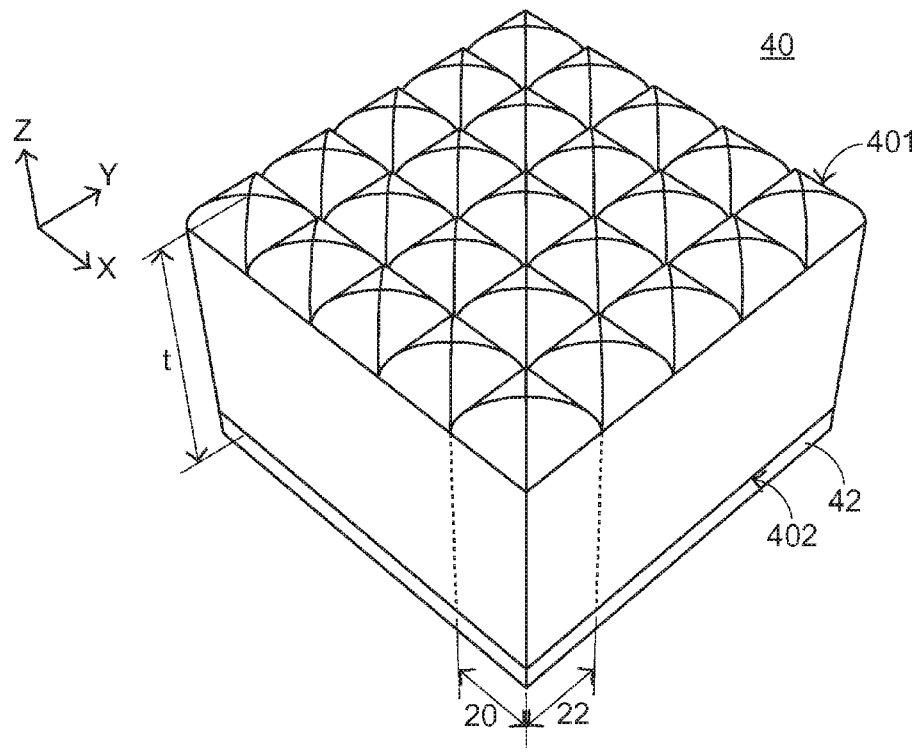
FIG. 3 is a schematic perspective view illustrating a lenticular lens sheet according to an embodiment of the present invention.

FIG. 3 is a schematic perspective view illustrating a lenticular lens sheet according to an embodiment of the present invention. As shown in FIG. 3, the lenticular lens sheet is a lens array with plural lenticular lenses, wherein each lenticular lens has two lens periods. According to the general cartesian coordinate system, the length of the lenticular lens sheet 40 along the X-axial direction or the Y-axial direction is larger than the length of the lenticular lens sheet 40 along the Z-axial direction. A first surface 401 and a second surface 402 of the lenticular lens sheet 40 are parallel with the X-Y plane. In this embodiment, the first surface 401 is a lens surface with curvatures, and the second surface 402 is a substantially flat surface. The second surface 402 of the lenticular lens sheet 40 is located near a composite image 42 or contacted and stacked on a composite image 42. Since the first surface 401 is closer to the human eyes (not shown) than the second surface 402, the composite image 42 may be viewed by the human eyes through the lenticular lens sheet 40. In such way, lenticular lens sheet 40 and the composite image 42 may be combined as an image displaying sheet.

Moreover, plural lens with curvatures are distributed on the first surface 401. These lenses have a first lens period (LPI) along a first direction and a second lens period along a second direction, wherein the first direction and the second direction are opposed to each other. It is preferred that the first direction and the second direction are orthogonal to each other. For example, as shown in FIG. 3, the lenses of the lenticular lens sheet 40 distributed on the first surface 401 may have a first lens period 20 along the X-axial direction and a second lens period 22 along the Y-axial direction. Preferably, the first lens period 20 is equal to the second lens period 22. Alternatively, in some embodiments, the first lens period 20 is not equal to the second lens period 22.

In views of the structures, the lenticular lens sheet 40 with two lens periods according to the present invention is still distinguished from the conventional lens array with an array of plural lenses (e.g. spherical lenses or honeycomb lenses). For example, each spherical lens of the conventional spherical lens array has a circular curvature distributed on the surface of the lens array and forms a circular projection zone on surface of the lens array. However, the regions between adjacent spherical lenses have no curvatures. Moreover, in views of the fabricating process, the conventional spherical lens array or the conventional honeycomb lens array should be produced by a precisely designed mold. In other words, the fabricating cost of the conventional spherical lens array or the conventional honeycomb lens array is too high to be applied to the production of cost-effective image displaying sheets.

For eliminating the above drawbacks, the present invention provides the lenticular lens sheet 40 with two lens periods. In views of the structures, the lenticular lens with curvatures may be seamlessly contacted with the adjacent lenticular lens. Consequently, the use of the lenticular lens sheet can enhance the image displaying performance. Furthermore, by using a cylinder lenticular engraving method to engrave the substrate along the X-axial direction and the Y-axial direction, a lenticular lens array with respective lens periods along two different directions can be produced.

The lenticular lens array that is produced by the cylinder lenticular engraving method may be also referred as a lenticular lens sheet template, which may be applied to mass production of the lenticular lens sheets. For example, a planar-type sheet comprising a lenticular lens sheet template may be produced by casing thermosetting resin. Alternatively, the lenticular lens sheet may be produced by thermoforming a cast. Alternatively, a lenticular lens array may be produced by applying heat or pressure to cut into or engrave into the region between a polished plate and a lenticular lens sheet template. Alternatively, the lenticular lens sheet may be produced by an injection molding process. Alternatively, the lenticular lens sheet may be produced by pressing resin onto a pre-formed sheet or a pre-formed film, wherein a lenticular lens sheet template may be engraved into the resin by an embossing roll. The current methods for mass production of the lenticular lens sheets have been described as above.

Consequently, when compared with the conventional spherical lenses or honeycomb lenses, the lenticular lens sheet of the present invention is produced more easily and feasible for mass production. In addition, the lenticular lens sheet of the present invention may be applied to cheap and widespread products such as billboards, decorating materials, furniture, or the like. For example, by using double rollers of an extruder to extrude the lenticular lens sheet and the composite image on both sides of a sheet material, a watermark effect may be generated in response to the change of the refractive index. Under this circumstance, the lenticular lens sheet may be applied to the fabrication of wrapping papers, table mats, shower curtains, glass plaques, stickers, tapes, or the like. Alternatively, after the lenticular lens sheet is fabricated, the composite image may be formed on or attached on the lenticular lens sheet by a color printing process or a fit printing process. Alternatively, the composite image is disposed on another carrier, and the carrier is located near the lenticular lens sheet. For example, the lenticular lens sheet is applied to a lighting film, a slide or a transparency.

Figure 4:
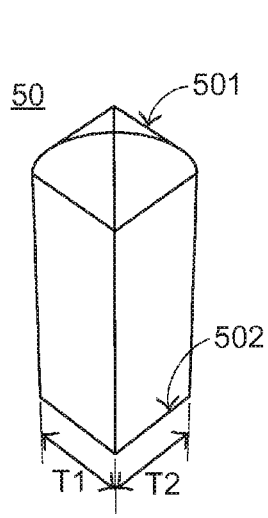
FIG. 4 is a schematic enlarged perspective view illustrating a single lenticular lens of the lenticular lens array according to the embodiment of the present invention.
Figure 5:
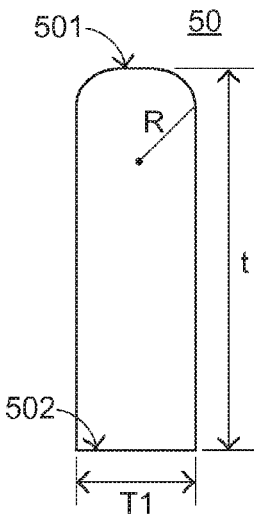
FIG. 5 is a schematic enlarged side view illustrating a single lenticular lens of the lenticular lens array according to the embodiment of the present invention.

FIG. 4 is a schematic enlarged perspective view illustrating a single lenticular lens of the lenticular lens array according to the embodiment of the present invention. FIG. 5 is a schematic enlarged side view illustrating a single lenticular lens of the lenticular lens array according to the embodiment of the present invention. As shown in FIGS. 4 and 5, each lenticular lens 50 has two lens periods T1 and T2 along two different directions. The lens period T1 and the lens period T2 may be identical or different. If the convenience of fabrication is taken into consideration, it is preferred that the lens period T1 and the lens period T2 are identical. The lenticular lens 50 has a curvature R on the first surface 501 corresponding to the lens period T1, wherein the opposite side also has the curvature R. Moreover, the lenticular lens 50 has the curvature R on the first surface 501 corresponding to the lens period T2, wherein the opposite side also has the curvature R. The second surface 502 is a flat surface. The distance from the climax of the lens on the first surface 501 to the second surface 502 is the thickness t of the lenticular lens 50. Generally, the thickness t of the lenticular lens 50 is a multiple of the curvature R. In an embodiment, the lens thickness t is about three times the curvature R. It is note that the lens thickness t is not limited to three times the curvature R. As shown in FIG. 4, the lenticular lens 50 has four lenses with four identical curvatures R on the first surface 501 in order to circumscribe a quadrilateral projection zone on the surface of the lenticular lens 50. Moreover, the four curvatures R comprise a pair of plane curvatures and a pair of profile curvatures, wherein each plane curvature is adjacent to the pair of profile curvatures, and each profile curvature is adjacent to the pair of plane curvatures.

Please refer to FIGS. 3 and 4 again. Along the same direction, any two adjacent plane curvatures or two adjacent profile curvatures are contacted and connected with each other, and there are no other portions therebetween. That is, there are no other curvatures or straight lines between any two adjacent plane curvatures. As for the lenticular lenses, any two adjacent lenticular lenses are in close contact with each other without any vacant space. In other words, the size of the projection zone on the second surface 502 corresponding to the curvature R is the lens period T1, and the size of the projection zone on the second surface 502 corresponding to the curvature R is the lens period T2. Of course, the curvature R, the curvature R, the lens period T1 or the lens period T2 is presented herein for purpose of illustration and description only. In this context, the size of the projection zone on the second surface 502 corresponding to the curvature R is the lens period T2, or the size of the projection zone on the second surface 502 corresponding to the curvature R is the lens period T1.

In this embodiment, as the curvature R is increased, the thickness t of the lenticular lens is increased, so that the lenticular lens may be applied to the lenticular lens sheet requiring high allowable thickness. As the curvature R is decreased, the thickness t of the lenticular lens is decreased, so that the lenticular lens may be applied to the lenticular lens sheet requiring low allowable thickness. As previously described, the commercially available lenticular lens sheet has a curvature along a single direction. On the other hand, the lenticular lens of the present invention has curvatures R along two directions. After the composite image and the lens thickness t are properly designed, regardless of whether the lenticular lens is tilted or flipped leftwards or rightwards or the lenticular lens is tilted or flipped upwardly or downwardly, the 3D depth effect or the jumping image effect along two directions can be generated. Moreover especially, the lens period T1 and the lens period T2 of the lenticular lens sheet of the present invention and the matched composite image can collaboratively generate the zooming in effect or the zooming out effect of the composite image, which will be illustrated later. Moreover, the lens thickness t is the distance from the climax of the curvature R on the first surface 501 to the second surface 502. Preferably, the lens thickness t is about three times the curvature R.

Figure 6:
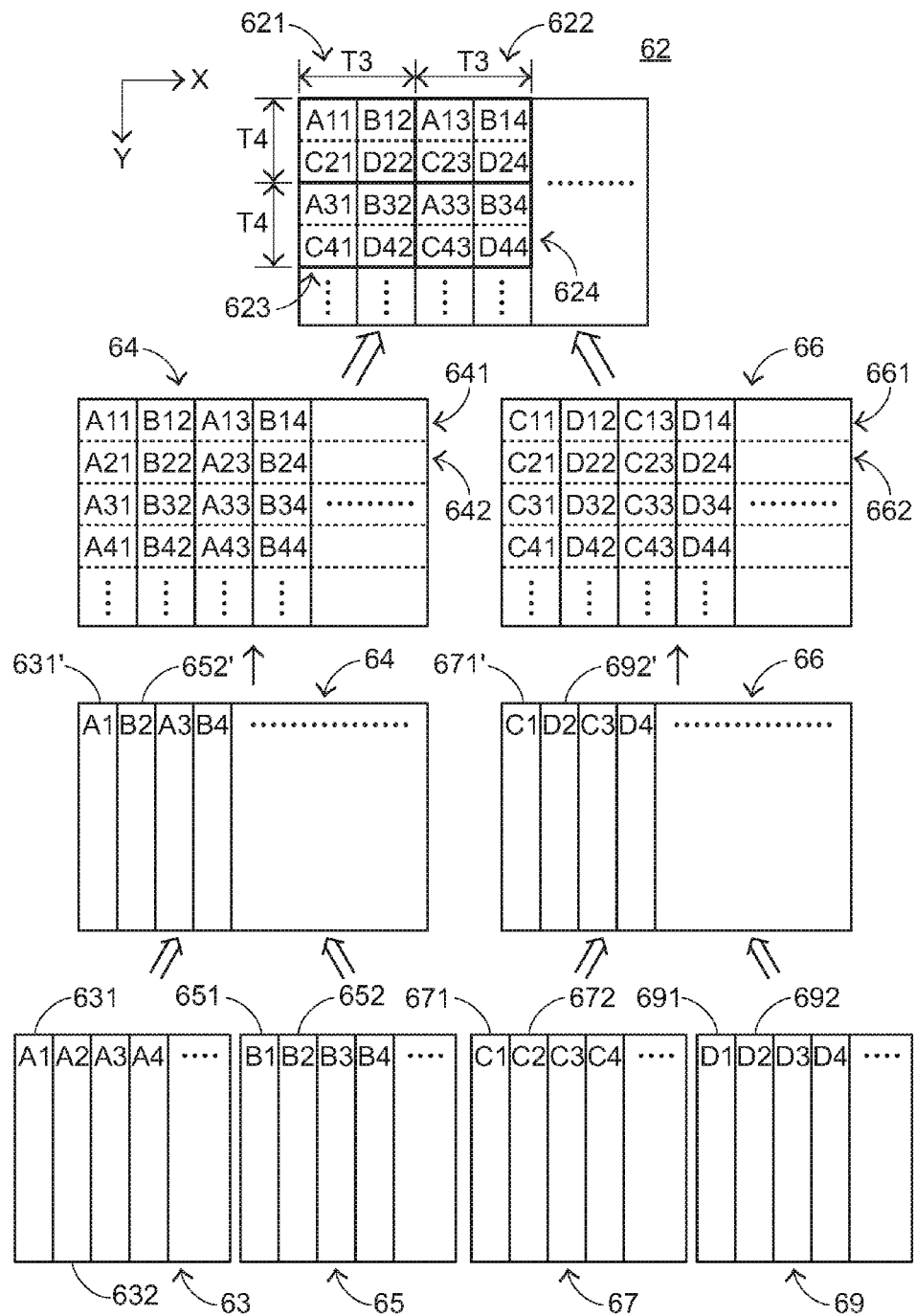
FIG. 6 schematically illustrates a composite image for use with the lenticular lens sheet of the present invention.

FIG. 6 schematically illustrates a composite image for use with the lenticular lens sheet of the present invention. As shown in FIG. 6, a two-dimensional composite image 62 is composed of plural composite image units 621, 622, 623 and 624. The plural composite image units 621, 622, 623 and 624 are arranged in a two-dimensional array. Each of the composite image units has a first image period T3 along a first direction and a second image period T4 along a second direction. In this embodiment, the composite image 62 comprises the pixels of the original images 63, 65, 67 and 69. The original images 63 and 65 are interlaced into a first interlaced image 64. The original images 67 and 69 are interlaced into a second interlaced image 66. The image interlacing process is based on the current interlacing technology.

A way of forming the first interlaced image 64 will be illustrated as follows. Firstly, the original images 63 and 65 are respectively sliced into plural sub-image strips 631, 632, 651, 652 along a direction (e.g. the Y direction). The sub-image strips 631 and 651 indicate the odd-numbered columns of sub-image strips, and the sub-image strips 632 and 652 indicate the even-numbered columns of sub-image strips. Then, the sub-image strips 631 and 652 are interlaced into the first interlaced image 64. That is, the odd-numbered columns of sub-image strips 631 of the original image 63 and the even-numbered columns of sub-image strips 652 of the original image 65 are sequentially retrieved and interlaced into the interlaced sub-image strips 631' and 652' of the first interlaced image 64. Similarly, the original images 67 and 69 are sliced into plural sub-image strips 671, 672, 691, 692 along a direction by an image-slicing process. Then, the sub-image strips 671 and 692 are interlaced into the second interlaced image 66. That is, the sub-image strips 671 and 692 are sequentially retrieved and interlaced into the interlaced sub-image strips 671' and 692' of the second interlaced image 66. It is noted that numerous modifications and alterations of the connection member may be made while retaining the teachings of the invention. For example, the even-numbered columns of sub-image strips 632 of the original image 63 and the odd-numbered columns of sub-image strips 651 of the original image 65 may sequentially retrieved and interlaced into the first interlaced image 64.

From the above discussions, each interlaced image is formed by interlacing respective portions of N original images, wherein N is a positive integer larger than 1. The way of producing the interlaced image comprises the following steps. Firstly, the N original images are sorted, so that each of the N original images is assigned as an M-th original image, wherein M sequentially denotes plural positive integers from 1 to N. Then, the M-th original image is sliced into plural columns of M-th sub-image strips along the direction parallel with the second direction (e.g. the Y direction). Then, the (M+N×C)-th columns of M-th sub-image strips of the M-th original image are selected, wherein C sequentially denotes 0 and plural positive integers equal to or larger than 1. Then, the selected (M+N×C)-th columns of M-th sub-image strips of the M-th original image are interlaced into an interlaced image, wherein the first image period is equal to the total width of the M-th sub-image strips.

In the above image interlacing process, each of the sub-image strips 631, 652, 671 and 692 is denoted by an I×1 pixel array, wherein I is the pixel number along the Y direction, and 1 is the pixel number along the X direction. For example, in the first interlaced image 64, the interlaced sub-image strips 631' in the first sequence along the X direction comprises the pixels A11, A21, A31, A41, . . . , and so on; the interlaced sub-image strips 631' in the third sequence comprises the pixels A13, A32, A33, A43, . . . , and so on; the interlaced sub-image strips 652' in the second sequence comprises the pixels B12, B22, B32, B42, . . . , and so on; and the interlaced sub-image strips 652' in the fourth sequence comprises the pixels B14, B24, B34, B44, . . . , and so on. Similarly, in the second interlaced image 66, the interlaced sub-image strips 671' in the first sequence along the X direction comprises the pixels C11, C21, C31, C41, . . . , and so on; the interlaced sub-image strips 671' in the third sequence comprises the pixels C13, C23, C33, C43, . . . , and so on; the interlaced sub-image strips 692' in the second sequence comprises the pixels D12, D22, D32, D42, . . . , and so on; and the interlaced sub-image strips 692' in the fourth sequence comprises the pixels D14, D24, D34, D44, . . . , and so on.

Similarly, in the first interlaced image 64, the interlaced sub-image strips 641 in the first sequence along the Y direction comprises the pixels A11, B12, A13, B14, . . . , and so on; the interlaced sub-image strips 642 in the second sequence comprises the pixels A21, B22, A23, B24 . . . , and so on. The rest may be deduced by analogy. Similarly, in the second interlaced image 66, the interlaced sub-image strips 661 in the first sequence along the Y direction comprises the pixels C11, D12, C13, D14 , . . . , and so on; the interlaced sub-image strips 662 in the second sequence comprises the pixels C21, D22, C23, D24 . . . , and so on. The rest may be deduced by analogy.

In according to a feature of the present invention, the first interlaced image 64 and the second interlaced image 66 are further processed by a second image interlacing process. In a case that the images are not rotated, the first image interlacing process and the second image interlacing process are performed along different directions. Please refer to FIG. 6 again. In a case that the first image interlacing process is performed along the X direction, the sub-image strips in the I×1 pixel array are interlaced into the first interlaced image 64 and the second interlaced image 66. In a case that the second image interlacing process is performed along the Y direction, the odd-numbered rows of interlaced sub-image strips 641 of the first interlaced image 64 and the are interlaced into a composite image 62. Next, take the composite image unit 621 even-numbered rows of interlaced sub-image strips 662 of the second interlaced image 66 of the composite image 62 for example. Along the first direction (e.g. the X direction), the total width of the interlaced sub-image strips 631' and 652' is equal to the first image period T3, or the total width of the interlaced sub-image strips 671' and 692' is equal to the first image period T3. Moreover, along the second direction (e.g. the Y direction), the total width of the interlaced sub-image strips 641 and 662 is equal to the second image period T4. From the above discussions, it is found that each of the composite image unit 621, 622, 623 and 624 includes portions of the original images 63, 65, 67 and 69. By tilting a lenticular lens sheet, the original images 63, 65, 67 and 69 are viewable through the lenticular lens sheet.

From the above discussions, a total number of N original images (N>1) are firstly provided. In this embodiment, four original images 63, 65, 67 and 69 (N=4) are provided. By an interlacing technology, half the total number (N/2) of interlaced images are obtained. For example, the first interlaced image 64 and the second interlaced image 66 are obtained. Then, the interlaced images are interlaced into the composite image units of the composite image. In this embodiment, the width of the interlaced unit of the first interlaced image 64 along the first direction (e.g. the X direction) is equal to the total width of the interlaced sub-image strips 631' and 652'. Similarly, the width of the interlaced unit of the second interlaced image 66 along the first direction (e.g. the X direction) is equal to the total width of the interlaced sub-image strips 671' and 692'. Consequently, for the composite image units 621, 622, 623 and 624 of the composite image, the width of the interlaced unit of the interlaced image along the first direction (e.g. the X direction) is equal to the first image period T3. That is, along the first interlacing direction, the total width of the interlaced sub-image strips 631' and 652' is equal to the first image period T3, or the total width of the interlaced sub-image strips 671' and 92' is equal to the first image period T3. Moreover, the width of the interlaced unit of the interlaced image along the second direction (e.g. the Y direction) is equal to the second image period T4. That is, the total width of the interlaced sub-image strips 641 and 662 is equal to the second image period T4, or the total width of the interlaced sub-image strips 661 and 642 is equal to the second image period T4.

In other words, the composite image at least comprises a portion of the first interlaced image and a portion of the second interlaced image. In addition, the composite image is produced by the following method. Firstly, the first interlaced image and the second interlaced image are respectively sliced into plural rows of first interlaced sub-image strips of the first interlaced image and plural rows of second interlaced sub-image strips of the second interlaced image along the direction parallel with the first direction (e.g. the X direction). Then, the odd-numbered rows of first interlaced sub-image strips and the even-numbered rows of second interlaced sub-image strips are selected. Then, the odd-numbered rows of first interlaced sub-image strips and the even-numbered rows of second interlaced sub-image strips are interlaced into the composite image, wherein each of the first interlaced sub-image strips is adjacent to two of the second interlaced sub-image strips, and the second image period is an integral multiple of the total width of the first interlaced sub-image strip and the second interlaced sub-image strip.

In the above embodiment, the way of producing the composite image units is presented herein for purpose of illustration and description only. By means of the lenticular lens sheet of the present invention, the composite image that is produced by interlacing several original images can be viewed. It is noted that the composite image may be varied according to the practical requirements. That is, the composite image used for the lenticular lens sheet of the present invention is not restricted.

Please refer to FIGS. 3 and 6 again. In a case that the composite image 62 is used as the composite image 42 of FIG. 3, the composite image 42 may be located near or attached on the second surface 402 of the lenticular lens sheet 40. If the vision line of the eyes of the observer is parallel with the X direction and the both sides of the lenticular lens sheet 40 are swung along the X direction, the observer can watch the first interlaced image 64 of the composite image 42. If the both sides of the lenticular lens sheet 40 are swung along the Y direction, the observer can watch the second interlaced image 66 of the composite image 42. Consequently, the uses of the lenticular lens sheet of the present invention and the composite image with image periods matching the lenticular lens sheet can produce the two-dimensional morphing effect, the dynamic image effect or the 3D image effect of the composite image 42.

Figure 7:
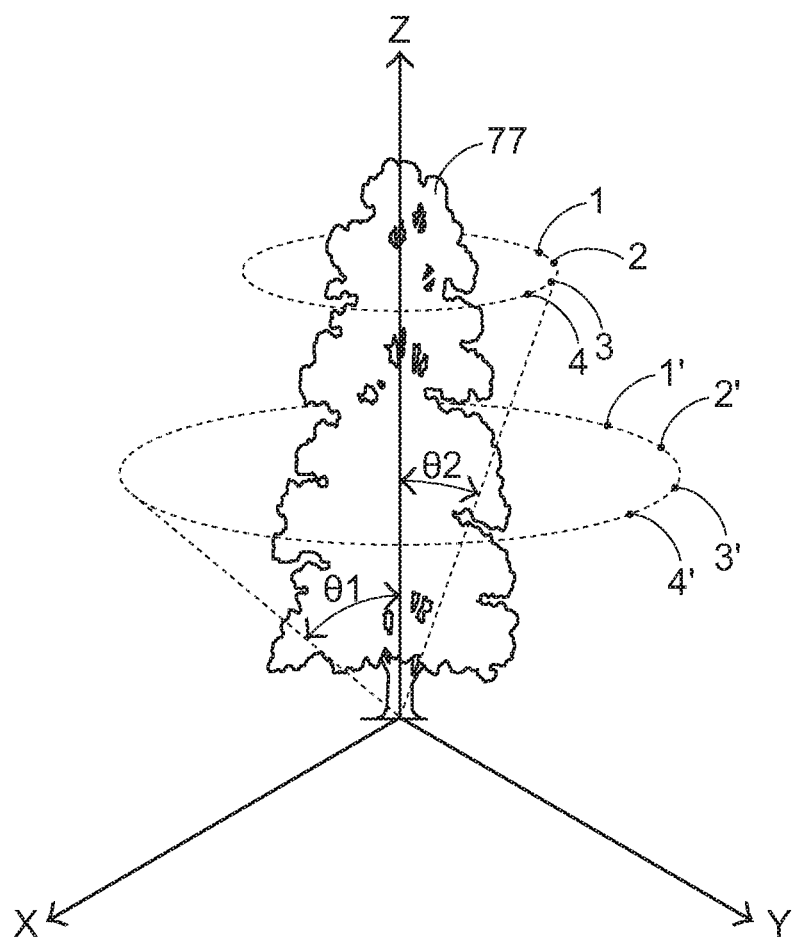
FIG. 7 schematically illustrates a way of obtaining original images from an object.
Figure 8:
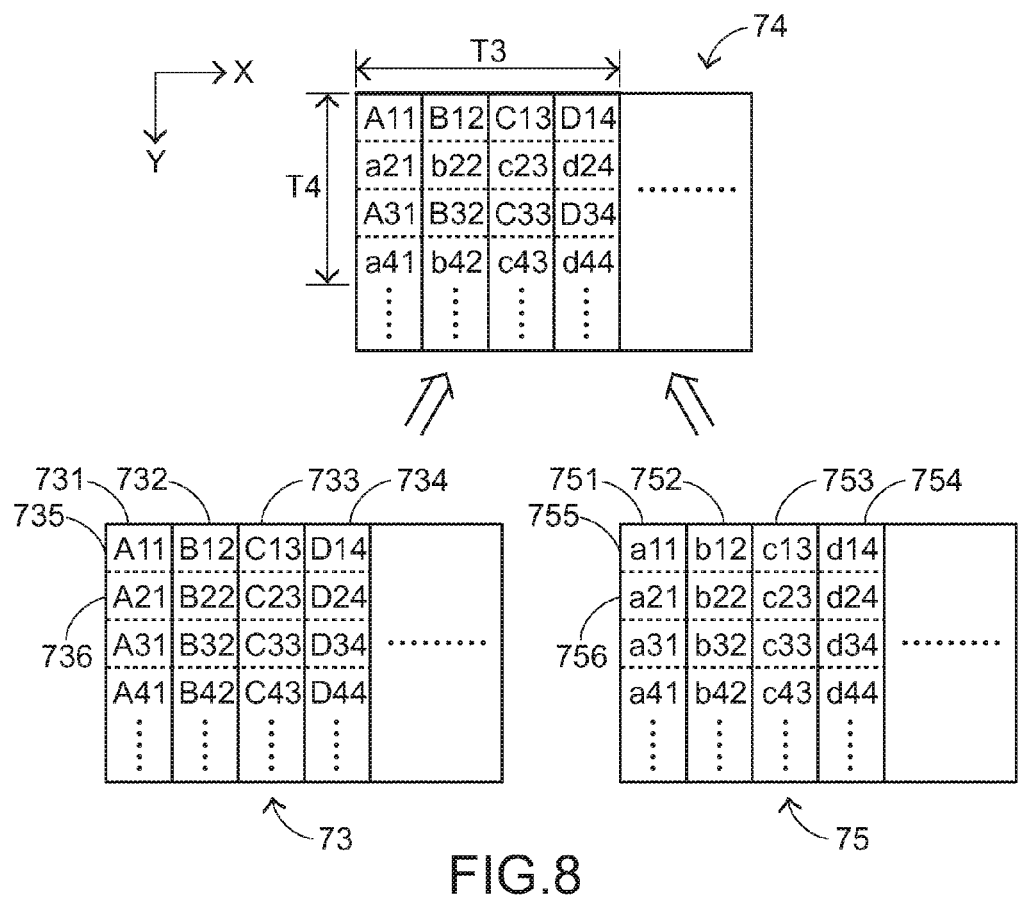
FIG. 8 schematically illustrates a composite image of the present invention produced according to the original image of FIG. 7.

FIG. 7 schematically illustrates a way of obtaining original images from an object. FIG. 8 schematically illustrates a composite image of the present invention produced according to the original image of FIG. 7. As shown in FIG. 7, an object 77 is located in a three-dimensional coordinate system (X-Y-Z), and the position to be focused by the user is denoted as an origin of the three-dimensional coordinate system. The user intends to capture the tree root of the object 77 (i.e. the origin of the three-dimensional coordinate system). There is an included angle θ1 between the viewpoint 1, 2, 3 or 4 and the Z axis. In a case that the tree root of the object 77 (i.e. the origin) is captured at the viewpoints 1, 2, 3 and 4, four original images corresponding to the included angle θ1 between the viewpoint and the Z axis are obtained. There is an included angle θ2 between the viewpoint 1', 2', 3' or 4' and the Z axis. Similarly, in a case that the tree root of the object 77 (i.e. the origin) is captured at the viewpoint 1', 2', 3' or 4' four original images corresponding to the included angle θ2 between the viewpoint and the Z axis are obtained.

Please refer to FIG. 8. The original images with the same included angle relative to the Z axis but with different viewpoints may be interlaced into a first interlaced image 73 and a second interlaced image 75 by the above-mentioned first image interlacing process. In the first interlaced image 73, the interlaced sub-image strips 731 denote the I×1 pixel array sub-image strips corresponding to the included angle θ1 (relative to the Z axis) and the first, fifth and ninth sequences at the viewpoint 1; the interlaced sub-image strips 732 denote the I×1 pixel array sub-image strips corresponding to the included angle θ1 (relative to the Z axis) and the second, sixth and tenth sequences at the viewpoint 2; the interlaced sub-image strips 733 denote the I×1 pixel array sub-image strips corresponding to the included angle θ1 (relative to the Z axis) and the third, seventh and eleventh sequences at the viewpoint 3; and the interlaced sub-image strips 734 denote the I×1 pixel array sub-image strips corresponding to the included angle θ1 (relative to the Z axis) and the fourth, eighth and twelfth sequences at the viewpoint 4. Moreover, in the first interlaced image 73, the interlaced sub-image strips 731 in the first sequence along the X direction comprises the pixels A11, A21, A31, A41, . . . , and so on; the interlaced sub-image strips 732 in the second sequence comprises the pixels B12, B22, B23, B42, . . . , and so on; the interlaced sub-image strips 733 in the third sequence comprises the pixels C31, C23, C33, C43, . . . , and so on; and the interlaced sub-image strips 734 in the fourth sequence comprises the pixels D14, D24, D34, D44, . . . , and so on. Moreover, in the first interlaced image 73, the interlaced sub-image strips 735 in the first sequence along the Y direction comprises the pixels A11, B12, C13, D14, . . . , and so on; and the interlaced sub-image strips 736 in the second sequence comprises the pixels A21, B22, C23, D24, . . . , and so on.

Similarly, in the second interlaced image 75, the interlaced sub-image strips 751 denote the I×1 pixel array sub-image strips corresponding to the included angle θ2 (relative to the Z axis) and the first, fifth and ninth sequences at the viewpoint 1'; the interlaced sub-image strips 752 denote the I×1 pixel array sub-image strips corresponding to the included angle θ2 (relative to the Z axis) and the second, sixth and tenth sequences at the viewpoint 2'; the interlaced sub-image strips 753 denote the I×1 pixel array sub-image strips corresponding to the included angle θ2 (relative to the Z axis) and the third, seventh and eleventh sequences at the viewpoint 3'; and the interlaced sub-image strips 754 denote the I×1 pixel array sub-image strips corresponding to the included angle θ2 (relative to the Z axis) and the fourth, eighth and twelfth sequences at the viewpoint 4'. Moreover, in the second interlaced image 75, the interlaced sub-image strips 751 in the first sequence along the X direction comprises the pixels a11, a21, a31, a41, . . . , and so on; the interlaced sub-image strips 752 in the second sequence comprises the pixels b12, b22, b3, b42, . . . , and so on; the interlaced sub-image strips 753 in the third sequence comprises the pixels c13, c23, c33, c43, . . . , and so on; and the interlaced sub-image strips 754 in the fourth sequence comprises the pixels d14, d24, d34, d44, . . . , and so on. Moreover, in the second interlaced image 75, the interlaced sub-image strips 755 in the first sequence along the Y direction comprises the pixels a11, b12, c13, d14, . . . , and so on; and the interlaced sub-image strips 756 in the second sequence comprises the pixels a21, b22, c23, d24, . . . , and so on.

Similar to the method of FIG. 6, the first interlaced image 73 and the second interlaced image 75 are further processed by a second image interlacing process. The first image interlacing process and the second image interlacing process are performed along different directions. In a case that the second image interlacing process is performed along the Y direction, the odd-numbered rows of interlaced sub-image strips 735 of the first interlaced image 73 and the even-numbered rows of interlaced sub-image strips 756 of the second interlaced image 75 are interlaced into a composite image 74. From the above discussions, it is found that the composite image 74 includes portions of the original images corresponding to the included angles θ1, θ2 (relative to the Z axis) and at different viewpoints. By simply tilting a lenticular lens sheet, different images of the tree root of the object 77 are viewable from different viewpoints through the lenticular lens sheet.

From the above discussions, the composite image is formed by interlacing respective portions of J interlaced images, wherein J is a positive integer larger than 2. In an embodiment, the present invention provides a method of producing a composite image from the interlaced images. The method comprises the following steps. Firstly, the J interlaced images are sorted, so that each of the J interlaced images is assigned as a K-th interlaced image, wherein K sequentially denotes plural positive integers from 1 to J, i.e. K=1, 2, J. Then, the K-th interlaced image is sliced into plural rows of K-th interlaced sub-image strips of the K-th interlaced image along the direction parallel with the first direction. Then, the (K+J×L)-th rows of K-th interlaced sub-image strips of the K-th interlaced image are selected, wherein L sequentially denotes 0 and plural positive integers equal to or larger than 1. That is, for processing the first interlaced image, the first, the (1+J)-th and the (1+2J)-th first interlaced sub-image strips are selected to be processed in the subsequent process. Then, the selected (K+J×L)-th rows of K-th interlaced sub-image strips of the K-th interlaced image are interlaced into the composite image, wherein the second image period is equal to the total width of the K-th interlaced sub-image strips.

From the above description, the observer can watch the morphing effect or the motion-changeable dynamic effect of the object at different viewpoints and at different included angles relative to the X axis, Y axis or Z axis. Consequently, the uses of the lenticular lens sheet and the composite image can display various imaging effects. Moreover, the way of designing the above composite image may be further used to produce the images that can be viewed through the lenticular lens sheet of the present invention by the observers at different included angles and at different viewpoints. Consequently, the diversity of the composite image will be enhanced.

Furthermore, as mentioned above, the lens period matches the image period. For example, in a case that the lens period and the image period are completely equal and completely overlapped (i.e. with the same angle), the morphing effect, the 3D effect or the dynamic effect of the composite image may be generated. In another case that the lens period and the image period are completely equal but are not completely overlapped (i.e. with a tilting angle), the zooming in effect or the zooming out effect of the composite image may be generated. In some other cases, the lens period and the image period are not equal, but there is a small difference between the lens period and the image period. For example, the image period is smaller than the lens period. Under this circumstance, the percentage difference between the lens period and the image period is smaller than 25%. Specially, if the percentage difference between the lens period and the image period is smaller than 10%, the zooming in effect of the composite image will be enhanced. Consequently, by utilizing the difference between the lens period and the image period and the lens thickness t, the depth-changing effect or the altitude-changing effect of the composite image can be generated. That is, the depth-changing effect or the altitude-changing effect of composite image under the lenticular lens sheet may be displayed through the thickness of the lenticular lens sheet.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An image displaying sheet, comprising:
a composite image comprising plural composite image units, wherein said plural composite image units are arranged in a two-dimensional array, wherein said plural composite image units have a first image period along a first direction and a second image period along a second direction, wherein said first direction and said second direction are different; and
a lens array stacked on said composite image, wherein said lens array has a first surface and a second surface opposite to said first surface, wherein plural lenticular lenses are distributed on said first surface, and said composite image is stacked on said second surface, wherein said plural lenticular lenses on said first surface have a first lens period along said first direction and a second lens period along said second direction;
wherein said composite image is produced by steps of:
providing J groups of original images corresponding to images of an object from plural viewpoints, where J is a positive integer larger than 1, wherein each group consists of N original images and each group forms an intermediate image, where N is a positive integer larger than 1;
sorting said N original images so that each of said N original images is assigned as an M-th original image, wherein M sequentially denotes plural positive integers from 1 to N;
slicing each M-th original image into plural columns of M-th sub-image strips along a direction parallel with said second direction;
sequentially selecting (M+N×C)-th columns of M-th sub-image strips of each M-th original image with M proceeding from 1 through N, and C proceeding from 0 through a preset number equal to or larger than 1;
combining said sequentially selected (M+N×C)-th columns of M-th sub-image strips of said M-th original image to form an intermediate image;
repeating said sorting, slicing, selecting and combining steps for the other group of groups of original images, thereby forming J intermediate images;
sorting said J intermediate images, so that each of said J intermediate images is assigned as a K-th intermediate image, wherein K sequentially denotes plural positive integers from 1 to J;
slicing each K-th intermediate image into plural rows of K-th intermediate sub-image strips of said K-th intermediate image along a direction parallel with said first direction;
sequentially selecting (K+J×L)-th rows of K-th intermediate sub-image strips of said K-th intermediate image with K proceeding from 1 through J, and L proceeding from 0 through a preset number equal to or larger than 1; and
combining said sequentially selected (K+J×L)-th rows of K-th intermediate sub-image strips of said K-th intermediate image to form said composite image.

2. The image displaying sheet according to claim 1, wherein each of said lenticular lenses is composed of four lens units having the same radius of curvature and intersecting at a climax on said first surface, wherein a distance from said climax to said second surface is substantially three times said radius of curvature, and a projection zone of one of said lenticular lens on said second surface has a width in said first direction equal to said fist lens period and a width in said second direction equal to said second lens period.

3. The image displaying sheet according to claim 1, wherein said first lens period is equal to said second lens period.

4. The image displaying sheet according to claim 1, wherein a percentage difference between said first lens period and said first image period is smaller than 25%, and a percentage difference between said second lens period and said second image period is smaller than 25%.

5. The image displaying sheet according to claim 1, wherein a percentage difference between said first lens period and said first image period is smaller than 10%, and a percentage difference between said second lens period and said second image period is smaller than 10%.

\* \* \* \* \*